US005289096A

United States Patent [19]

Takeda

[11] Patent Number: 5,289,096

[45] Date of Patent: Feb. 22, 1994

[54] PRESS MACHINE STROKE OPERATION MECHANISM AND OPERATION CONTROL METHOD THEREFOR

[75] Inventor: Shinya Takeda, Kawasaki, Japan

[73] Assignee: Mechtro Joban International Co., Ltd., Tokyo, Japan

[21] Appl. No.: 30,723

[22] Filed: Mar. 12, 1993

[30] Foreign Application Priority Data

Dec. 21, 1992 [JP] Japan .................................. 4-355427

[51] Int. Cl.[5] .............................................. G06F 15/46

[52] U.S. Cl. .................................... 318/560; 318/567; 228/102; 72/405; 83/552

[58] Field of Search ................................ 318/560-646; 425/451.6, 451.5, 149, 150; 300/92; 360/92; 414/796.9, 797.8; 83/552; 228/107; 72/405

[56] References Cited

U.S. PATENT DOCUMENTS

| | | | |
|---|---|---|---|
| 3,369,160 | 2/1968 | Koppel et al. . | |
| 4,988,273 | 1/1991 | Faig et al. | 318/254 X |
| 5,046,241 | 9/1991 | Ricard | 29/863 |
| 5,134,430 | 7/1992 | Koizumi | 354/320 |
| 5,157,565 | 10/1992 | Domel | 300/92 |
| 5,164,203 | 11/1992 | Tanaka et al. | 425/149 |
| 5,164,209 | 11/1992 | Goto | 425/451.6 |
| 5,187,531 | 2/1993 | Ozawa et al. | 355/308 |

*Primary Examiner*—Paul Ip
*Attorney, Agent, or Firm*—Rogers & Killeen

[57] ABSTRACT

The present invention provides a stroke operation mechanism which is incorporated in a single-structure press machine so that various types of stroke operations can easily be generated on the slide side, and a control method for controlling the stroke operation mechanism so as to cause the mechanism to exhibit various types of stroke operations. The press machine stroke operation mechanism has a driving system having a feed screw member disposed on a plane in parallel therewith, at least one pair of nut members screwed on the screw member and moved by rotation of the screw member so as to separate from and approach to each other, and a servomotor for supplying torques for normal and reverse rotations to the screw member; and a slide system having a slide member supported below the screw member at right angles therewith so as to be vertically slidable, and a transmission bar member having an upper end axially connected to the nut members and a lower end axially connected to the slide member. The rotational frequency and the rotational speed of the servomotor are controlled for controlling the position and speed of the slide member between the upper dead center and the lower dead center during the stroke motion of the slide member, which is caused by rotation of the motor.

12 Claims, 3 Drawing Sheets

PRESS MACHINE STROKE OPERATION MECHANISM AND OPERATION CONTROL METHOD THEREFOR

BACKGROUND OF THE INVENTION

The present invention relates to a press machine stroke operation mechanism comprising a servo motor and a link mechanism, and a method of controlling the position and speed of the stroke operation of the mechanism so that the press machine is operated in accordance with the working contents of the intended press work.

Press machines using a servo motor as a driving source of a stroke operation mechanism are proposed in Japanese Patent Laid-Open Nos. 62-252700, 62-296999 and 62-297000. A press machine using a link mechanism as a stroke operation mechanism is also known as a quick-return press or the like.

However, the previously proposed press machines using a servo motor as a driving source are screw presses and are developed as single purpose machines for caulking. Thus such press machines are not intended to be used considering the pressure applied to a workpiece, the pressure speed or a position in a stroke where the pressure and speed are applied.

Since the link mechanism of the known link press is also incorporated into a machine in order to simply quickly return a slide member, the same press mechanism cannot be used for press works having different work contents.

However, if the way of applying the pressure and the pressure speed to a workpiece can be changed for working different workpieces by a single press machine, press machine makers need not to produce different machines according to work contents, and the user also need not to buy and install machines respectively required for different work contents. It is thus thought that an attempt can be made to significantly rationalize the press work from various viewpoints.

SUMMARY OF THE INVENTION

In consideration of the above point, an object of the present invention is to provide a stroke operation mechanism which is incorporated into a single structure press machine so that various types of stroke operations can easily be produced on the slide side, and a control method for causing the stroke operation mechanism to exhibit various stroke operation speeds.

In order to achieve the object, a stroke operation mechanism of the present invention comprises a driving system comprising a feed screw member disposed on a plane in parallel therewith and provided with threads in different feed directions, at least one pair of nut members screwed on the screw member so as to be forwardly and backwardly moved in directions in which the nut members separate from and approach to each other by the rotation of the screw member, and a servomotor for selectively supplying torques for normal and reverse rotations to the screw member; and a slide system comprising a slide member supported below the screw member at right angles therewith so as to be vertically slidable, and a transmission bar member having an upper end portion axially connected to the nut members and a lower end portion axially connected to the slide member.

The present invention also provides a method of controlling the press machine stroke operation mechanism comprising a driving system comprising a feed screw member disposed on a plane in parallel therewith, at least one pair of nut members screwed on the screw member so as to be forwardly and backwardly moved in directions in which the nut members separate from and approach to each other by the rotation of the screw member, and a servomotor for supplying torques for normal and reverse rotations to the screw member; and a slide system comprising a slide member supported below the screw member at right angles therewith so as to be vertically slidable, and a transmission bar member having an upper end portion axially connected to the nut members and a lower end portion axially connected to the slide member. In the control method, the rotational frequency and the rotational speed of the servomotor are controlled for controlling the position and the speed of the slide member between the top dead center and the bottom dead center during the stroke motion of the slide member, which is caused by rotation of the servomotor.

DESCRIPTION OF THE PREFERRED EMBODIMENT

Figure 1:
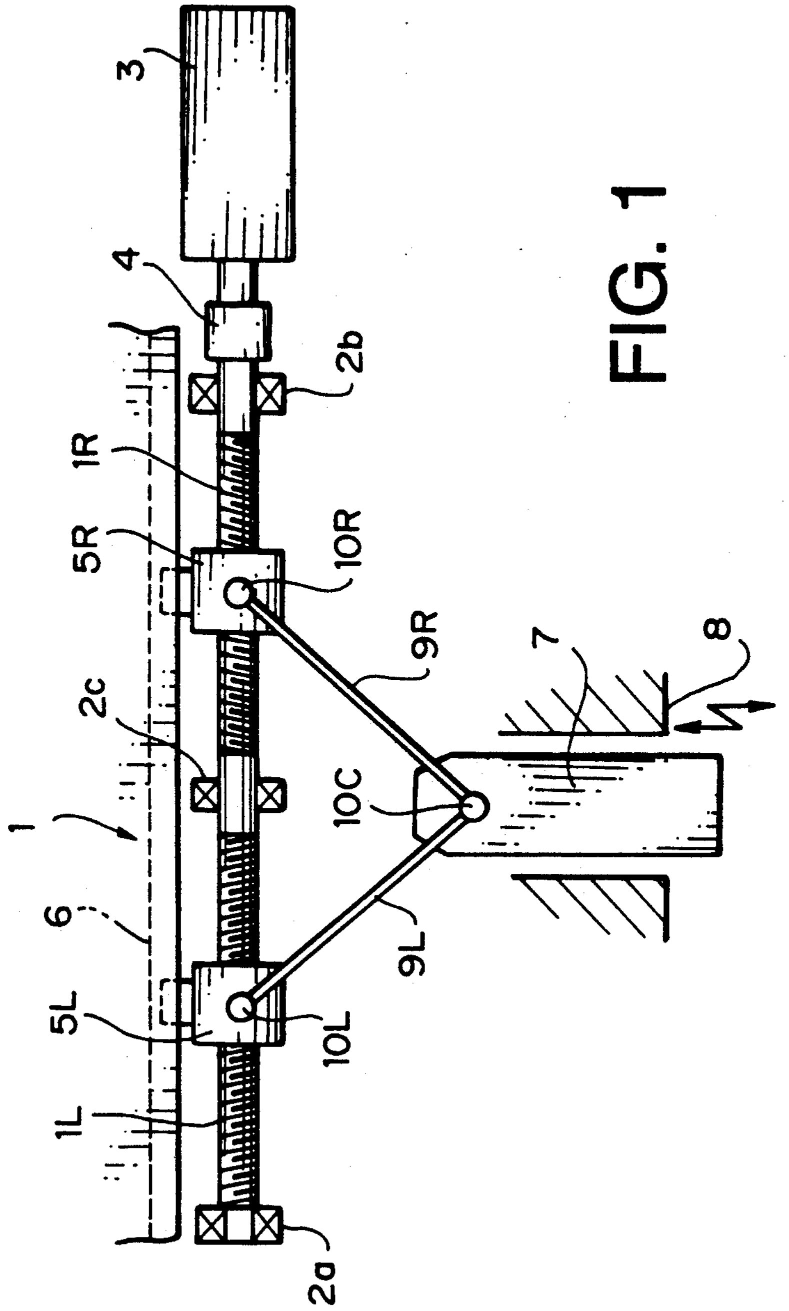
FIG. 1 is a front view showing a stroke operation mechanism in accordance with an embodiment of the present invention.
Figure 2:
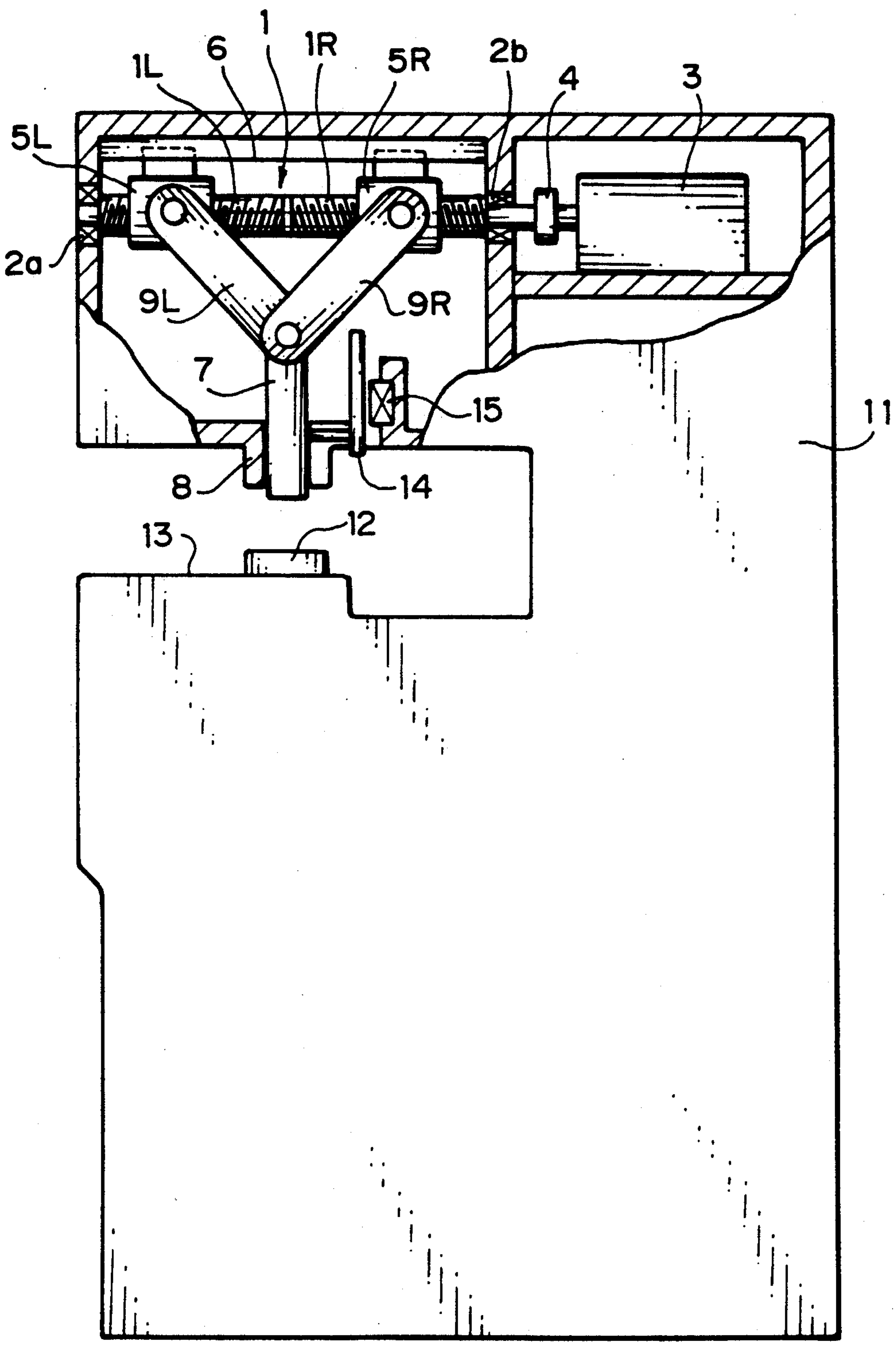
FIG. 2 is a side view of an example of press machines to which the stroke operation mechanism shown in FIG. 1 is applied.
Figure 3:
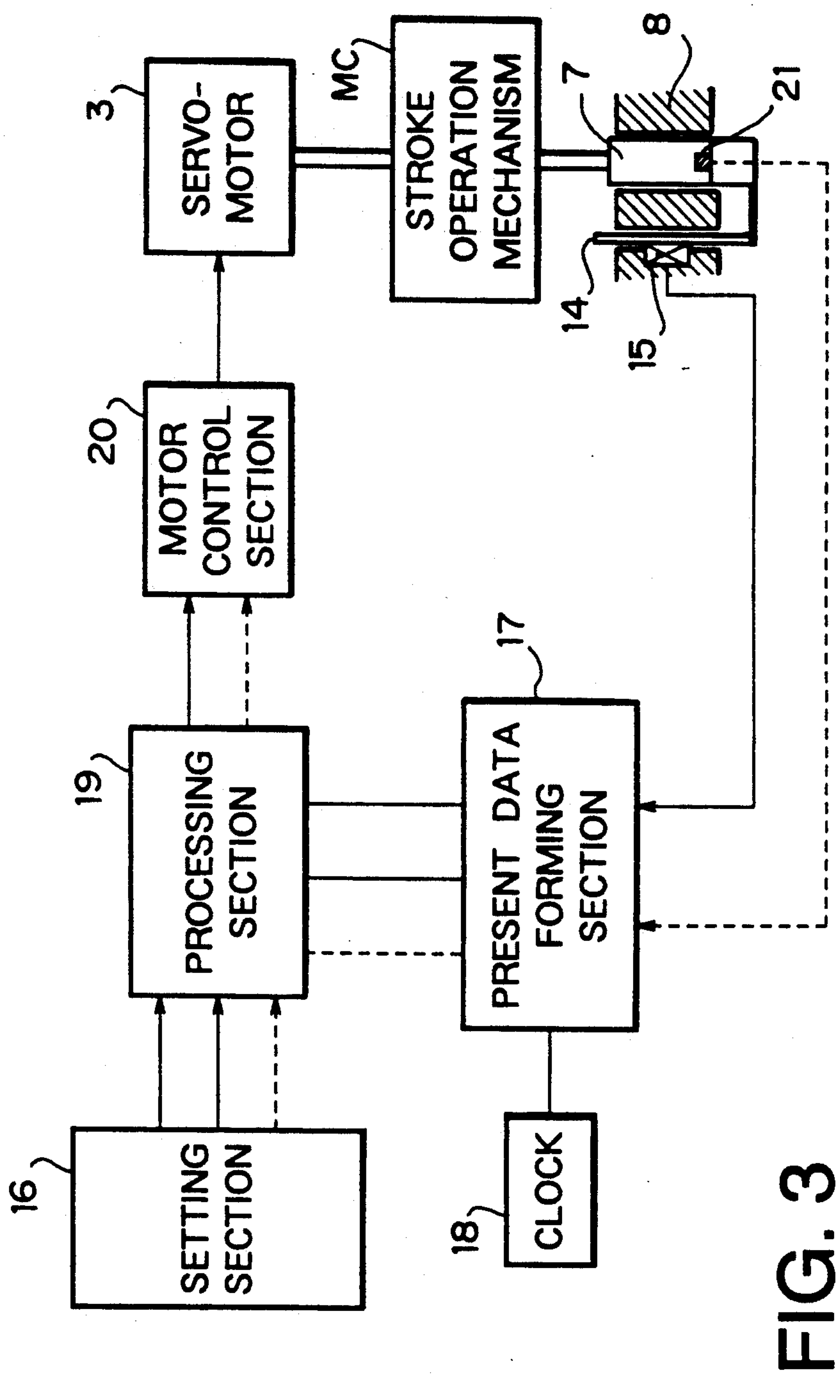
FIG. 3 is a block diagram showing an example of a control system of the stroke operation mechanism shown in FIG. 1.

A stroke operation mechanism and a control method therefor are described with reference to embodiments of the present invention. FIG. 1 is a front view showing a stroke operation mechanism according to an embodiment of the present invention, FIG. 2 is a side view showing an example of a press machine to which the stroke operation mechanism of the present invention shown in FIG. 1 is applied, and FIG. 3 is a block diagram showing an example of a control system for the stroke operation mechanism of the present invention shown in FIG. 1.

In FIG. 1, reference numeral 1 denotes a feed screw having threads 1L and 1R which are formed in the left and right sides thereof in opposite directions, the screw 1 being horizontally disposed. Reference numerals 2*a*, 2*b* and 2*c* respectively denote bearings for supporting the both ends and an intermediate portion of the screw 1 where no thread is formed. Reference numeral 3 denotes a servo motor connected to the right end of the screw 1 shown in FIG. 1 through a joint 4. Reference numerals 5L and 5R respectively denote left and right nut members which are screwed on the external threads 1L and 1R formed on the left and right sides of the screw 1. Reference numeral 6 denotes a slide guide used for locking the nut members 5L and 5R, the projections 51 and 52 of the nut members 5L and 5R being supported by the guide 6.

When the feed screw 1 is rotated by the servomotor 3 in a normal or reverse direction, the left and right nut members 5L and 5R screwed thereon are thus moved so as to separate from or approach to each other.

Reference numeral 7 denotes a vertical slide member disposed at right angles with the feed screw 1, and reference numeral 8 a guide holder for the slide member. When the mechanism is applied to a press machine, a working die is provided below the lower end of the slide member 7.

In the present invention, the vertical sliding motion of the slide member 7, i.e., the stroke motion thereof, is caused by connecting the nut members 5L and 5R to the slide member 7 through connecting members 9L and 9R, respectively. The stroke operation mechanism which is applied to a press machine is arranged as described above.

Namely, the upper ends of the connecting members 9L an 9R are connected to the nut members 5L and 5R by shafts 10L and 10R, respectively. On the other hand, the lower ends of both members 9L and 9R are connected to the upper end of the slide member 7 by a shaft 10c. When the nut members 5L and 5R are moved on the screw 1 so as to separate from and approach to each other, the slide member 7 thus makes a vertical stroke motion within the guide holder 8.

The stroke operation mechanism shown in FIG. 1 is designed so that the slide member 7 makes stroke motions for press works having various work contents. However, the stroke operation mechanism of the present invention is not limited to the mechanism shown in FIG. 1. For example, two feed screws respectively having a right-hand thread and a left-hand thread are arranged parallel, and the nut members 5L and 5R may be screwed on the two screws and connected to the stroke member 7 through the connecting members 9L and 9R, respectively.

The stroke operation mechanism of the present invention shown in FIG. 1 can be applied to a press machine, for example, as shown in FIG. 2. An example of press machines provided with the stroke operation mechanisms of the present invention is described with reference to FIG. 2. In FIG. 2, the same reference numerals as those in FIG. 1 denote the same members.

In FIG. 2, the stroke operation mechanism of the present invention shown in FIG. 1 is mounted on the upper portion of a C-shaped frame 11. In the frame 11, a table or bolster 13 for holding a mold 12 such as a lower mold or the like is formed on a surface opposite to the slide member 7. Reference numeral 14 denotes a slide motion detection bar provided on the slide member 7, and reference numeral 15 denotes a position detector provided opposite to the detection bar 14. In this arrangement, a workpiece (not shown) placed between the slide member 7 and the mold 12 is worked on in various manners by the stroke motion of the slide member 7 caused by normal and reverse rotation of the servomotor 3 and the mold 12.

The servomotor 3 of the stroke operation mechanism in the press machine shown in FIG. 2 is controlled by, for example, the control system shown in FIG. 3. In FIG. 3, reference numeral 16 denotes a setting section for setting predetermined data such as the stroke speed at a stroke position, pressure and the like on the slide member 7; reference numeral 17, a present data forming section for collecting data from the position detector 15 and forming present data such as the position of the slide member 7 during a stroke motion, the speed, the pressure applied and the like; reference numeral 18, a reference clock of the data forming section 17; reference numeral 19, a processing section for comparing the predetermined data of the setting section 16 and the present data of the present data forming section 17; and reference numeral 20, a motor control section for outputting a control signal for the servomotor 3 on the basis of the output from the processing section 19. In FIG. 3, although the same reference numerals as those in FIGS. 1 and 2 denote the same members, the stroke operation mechanism except the servomotor 3 is denoted by reference character MC. A pressure sensor 21 is also provided on the slide member 7 so that the data of the pressure sensor 21 is input to the present data forming section 17.

As described above, during the stroke operation of the slide member 7, the stroke speed of the slide member 7 can be controlled only by controlling the servomotor 3 at any desired stroke position. The stroke operation mechanism of the present invention thus permits various press works such as shearing, coining, free bending, cold extrusion, deep drawing, swaging and the like to be realized by a single stroke operation mechanism.

When the press machine shown in FIG. 3 is used as a multipurpose punch press, and various set dies such as a trimming die, a notch die and the like, all of which are standardized and commercially available, may be set between the slide member 7 and the table 13.

As described above, the present invention provides a stroke operation mechanism comprising a combination of a feed screw mechanism and a link mechanism, and driven by the driving force obtained from a servomotor which can be servo-controlled. The present invention thus has the significant effect of enabling all press works having various types of stroke operations or press works in a wider range than a conventional general purpose press using a single press machine provided with the mechanism of the present invention.

What is claimed is:

1. A press machine stroke operation mechanism comprising: a driving system comprising, a feed screw member having threads in different feed directions, at least one pair of nut members which are screwed on the threads in different feed directions and which are moved by rotation of said screw member so as to separate from and approach each other, and a servomotor for selectively supplying torques for normal and reverse rotations to said screw member; and a slide system comprising, a vertically disposed slide member supported below said screw member at right angles therewith so as to be vertically slidable, said slide member having a bottom end adapted to apply pressure directly to a work piece when said stroke operation mechanism is operated, and two transmission bar members, each of said transmission bar members having an upper end connected to one of said nut members and a lower end connected to said slide member at a single location near a top end thereof that is common to both said transmission bar members so that both said transmission bar members apply force directly to said slide member when said stroke operation mechanism is operated.

2. A method of controlling the operation of a press machine stroke operation mechanism, the mechanism having (i) a feed screw member with at least one pair of nut members screwed on said screw member that are moved by rotation of said screw member so as to separate from and approach each other, (ii) a servomotor for supplying torques for normal and reverse rotations to said screw member, (iii) a slide member supported below said screw member at right angles therewith so as to be vertically slidable to apply pressure to a work piece, and (iv) a transmission bar member having an upper end connected to said nut members and a lower end connected to said slide member, the method comprising the steps of:

(a) determining said slide member's position and speed; and (b) controlling the rotational speed of said servomotor in response to the determined position and speed to thereby control the position and the speed of said slide member between the upper dead center and the bottom dead center in the stroke motion of said slide member.

3. The method of claim 2 further comprising the steps of:

(c) determining the pressure applied by said slide member to a work piece; and (d) controlling the pressure applied by said slide member to the work piece in response to said determined pressure.

4. The method of claim 2 wherein said slide member is vertically disposed and said transmission bar member is connected to an upper end of said slide member, the method further comprising the step of applying pressure to the work piece at a lower end of said slide member.

5. The method of claim 4 wherein said transmission bar member comprises two rods, each of said rods having an upper end connected to one of said nut members and a lower end connected to said slide member at a single location near the upper end thereof that is common to both said rods.

6. The method of claim 3 wherein said step of controlling the pressure comprises the steps of providing a predetermined pressure value and comparing said determined pressure to said predetermined pressure value.

7. The mechanism of claim 1 further comprising a control system for controlling the operation of said servomotor, said control system comprising:

sensor means for determining the position and speed of said sliding member; and control means for controlling the rotational speed of said servomotor in response to said sensor means.

8. The mechanism of claim 1 further comprising a C-shaped housing for said slide system, said slide system being housed in an upper arm of said C-shaped housing so that said bottom end of said sliding member is able to apply pressure to a work piece disposed on a lower arm of said C-shaped housing.

9. The mechanism of claim 1 further comprising a control system for controlling the operation of said servomotor, said control system comprising:

pressure sensing means for determining the pressure applied to the work piece; and control means for controlling said servomotor in response to said pressure sensing means.

10. The mechanism of claim 9 wherein said control means comprises means for providing a predetermined pressure value and means for comparing said predetermined pressure value to a pressure from said pressure sensing means.

11. A press machine comprising:

a sliding machine for applying pressure to a work piece at a first end of said sliding member;

a driving system for moving said sliding member towards and away from the work piece, said driving system comprising, a feed screw member disposed in a direction generally perpendicular to the direction of movement of said sliding member and having threads in opposite feed directions, a servomotor for rotating said feed screw member, one pair of nut members which are moved towards or apart from one another when said feed screw member rotates, and two transmission means, each having one end connected to said nut members and the other end connected to said sliding member at a second end thereof;

a position sensor for determining the location of said sliding member;

a pressure sensor for determining the pressure applied by said sliding member on a workpiece when said press maching is operating; and a control system for controlling movement of said sliding member responsive to said position sensor and said pressure sensor.

12. The press machine of claim 11 further comprising a C-shaped housing for said sliding member and said driving system, said sliding member being housed in an upper arm of said C-shaped housing and arranged vertically so that said first end of said sliding member is able to apply pressure to a work piece disposed on a lower arm of said C-shaped housing.

* * * * *